United States Patent [19]
Tweedie et al.

[11] Patent Number: 6,029,726
[45] Date of Patent: Feb. 29, 2000

[54] APPARATUS FOR INSTALLING A FLEXIBLE CURED IN PLACE LATERAL SEAL IN AN EXISTING MAIN PIPELINE

[75] Inventors: John Tweedie, St. Peters, Mo.; Philip M. Smith, Fort Worth, Tex.; Jeff P. Wells, Chesterfield; Kerry D. Severs, St. Peters, both of Mo.; Kevin P. Murray, Schaumburg, Ill.

[73] Assignee: Insituform (Netherlands) B.V., Netherlands

[21] Appl. No.: 08/978,732

[22] Filed: Nov. 26, 1997

[51] Int. Cl.[7] .............................. B29C 63/00; B29C 63/28
[52] U.S. Cl. .................. 156/423; 156/379.6; 156/379.8; 156/380.9
[58] Field of Search ...................................... 156/294, 287, 156/423, 380.9, 379.8, 379.6, 580, 156; 264/269; 138/97, 98

[56] References Cited

U.S. PATENT DOCUMENTS

| | | |
|---|---|---|
| 2,944,994 | 7/1960 | Singleton et al. . |
| 3,804,663 | 4/1974 | Clark . |
| 3,946,761 | 3/1976 | Thompson et al. ........................ 138/98 |
| 4,009,063 | 2/1977 | Wood . |
| 4,135,958 | 1/1979 | Wood . |
| 4,425,287 | 1/1984 | Hesse et al. . |
| 4,434,115 | 2/1984 | Chick . |
| 4,439,469 | 3/1984 | Wood . |
| 4,581,247 | 4/1986 | Wood . |
| 4,680,066 | 7/1987 | Wood . |
| 4,991,006 | 2/1991 | Wood . |
| 5,018,545 | 5/1991 | Wells . |
| 5,199,463 | 4/1993 | Lippiatt ...................................... 138/98 |
| 5,329,063 | 7/1994 | Endoh . |
| 5,340,160 | 8/1994 | Meijers et al. . |
| 5,393,481 | 2/1995 | Wood . |
| 5,395,862 | 3/1995 | Neckers et al. . |
| 5,423,630 | 6/1995 | Imoto et al. ........................... 138/97 X |
| 5,439,033 | 8/1995 | Kamiyama et al. ....................... 138/98 |
| 5,451,284 | 9/1995 | Ikeda et al. ............................ 138/97 X |
| 5,451,343 | 9/1995 | Neckers et al. . |
| 5,514,519 | 5/1996 | Neckers et al. . |
| 5,606,171 | 2/1997 | Neckers et al. . |
| 5,609,439 | 3/1997 | Schreiner et al. ................... 156/156 X |
| 5,623,080 | 4/1997 | Neckers et al. . |
| 5,624,629 | 4/1997 | Wood . |
| 5,639,802 | 6/1997 | Neckers et al. . |
| 5,692,543 | 12/1997 | Wood . |

FOREIGN PATENT DOCUMENTS

| | | |
|---|---|---|
| 0 025 359 | 9/1979 | European Pat. Off. . |
| 0 039 838 | 11/1981 | European Pat. Off. . |
| 406876 | 1/1991 | European Pat. Off. ............. 156/275.5 |
| 0 518 521 A2 | 12/1992 | European Pat. Off. . |
| 39 29 558 A1 | 3/1991 | Germany . |
| 40 31 949 A1 | 1/1992 | Germany . |
| 4207038 | 9/1993 | Germany . |
| 2 041 147 | 9/1980 | United Kingdom . |
| WO 91/07619 | 3/1991 | WIPO . |
| WO 91/16568 | 10/1991 | WIPO . |
| WO 95/08737 | 3/1995 | WIPO . |

*Primary Examiner*—Jeff H. Aftergut
*Attorney, Agent, or Firm*—Cowan, Liebowitz & Latman, P.C.; Michael I. Wolfson; Lloyd G. Buchanan

[57] ABSTRACT

An apparatus for installing a cured in place lateral seal in an existing main pipeline wherein the lateral seal includes a brim portion bonded to a short tubular portion is provided. The apparatus includes a flexible bladder mounted on a cylindrical housing with the bladder having a recess with an inflatable arm which can be tucked within the housing for receiving the tubular portion of the seal with the brim portion along the outer portion of the bladder. The cartridge is removably mountable on a sled or robot device with positioning motors for positioning the seal at the opening of the lateral pipeline. The use of replaceable bladder cartridges allows an operator to load a second new seal on a cartridge a first seal on a bladder cartridge mounted on the sled is being cured in place.

15 Claims, 8 Drawing Sheets

APPARATUS FOR INSTALLING A FLEXIBLE CURED IN PLACE LATERAL SEAL IN AN EXISTING MAIN PIPELINE

BACKGROUND OF THE INVENTION

This invention relates to an apparatus for the installation of a flexible lateral seal which is impregnated with a curable resin, and more particularly to an apparatus having a silicone bladder with a cavity for receiving the flexible lateral seal and which can be inflated to form a seal along the main pipeline and invert the lateral seal into the lateral pipeline from the main pipeline.

The most widely practiced method of lining existing pipelines and conduits using a flexible resin impregnated lining or "cured in place pipe" is the Insituform® Process and is described in U.S. Pat. Nos. 4,009,063 and No. 4,064,211, the contents of which are incorporated herein by reference. Briefly, in the Insituform® Process, an elongated flexible tubular lining of a resin impregnable material, such as a needled felt, which has been impregnated with a thermosetting synthetic resin, is installed within an existing pipeline that is in need of repair. The impregnated liner may be pulled into the conduit by a rope or cable, and a fluid-impermeable inflation bladder or tube is then everted within the liner as described in detail in U.S. Pat. No. 4,009,063. Alternately, the liner is installed utilizing an eversion process as described in U.S. Pat. No. 4,064,211. The liners utilized in the Insituform® Process are flexible and generally have a smooth impermeable coating on one side. After inversion, this smooth layer becomes the inside of the liner.

After the flexible liner is positioned within the conduit, the liner is pressurized from within, preferably using a fluid such as water. The fluid pressure forces the liner radially outwardly to engage and conform to the interior surface of the existing pipeline. The resin is then cured by recirculating heated water to form a relatively hard, tight-fitting rigid pipe lining that effectively relines the existing pipeline. In addition to curing by heat, the resin can be cured using other forms of radiant energy, such as ultra violet light as described in U.S. Pat. No. 4,135,958 or visible light in U.S. Pat. No. 4,518,247 and U.S. Pat. No. 4,680,066, the contents of which are incorporated herein by reference. Alternatively, radiant energy in the form of electrical energy or sound waves can be used to initiate the cure. Once the liner is completely cured, lateral connections are cut to existing services to the liner by remote cutters, which are common expedients in the art.

There is a strong demand and a need to seal the connections between the main conduit and any lateral pipes, in addition to the repair of the main pipeline. This is an important consideration in the process of relining an entire existing sewer system in order to effectively prevent the ingress of ground water into the system and outflow of effluent from the system.

In a typical municipal sewer system, there are a plurality of lateral pipeline entering a main conduit between adjacent manhole access points. The time needed to cure a cured in place liner that has been installed in a main pipeline is typically between four and six hours. Using existing methods of lining or lateral pipelines or is not possible to perform any significant repair or lining operations of the plurality of lateral connections at the same time that a main conduit is being lined. Repair or sealing of each lateral connection using conventional lining methods is difficult. Such long cure times would generally increase the amount of time required to complete the repair of a particular line by almost a full day of work for each lateral connection. Since a typical residential street may have about ten or more homes between manholes, this would increase the operating time needed to complete the lining operation for repair of the main pipeline between adjacent manholes from one day to ten days or more.

There are presently several proposals available for lining lateral pipelines and forming a seal at the lateral connection. Some of these call for lining the lateral from the outlet of the service lateral inward to the mainline conduit. One such method is described in U.S. Pat. No. 5,108,533. Others utilize a launcher-type apparatus that inserts a lining from the main pipeline into the lateral connection at a location remote from the access to the main pipeline. This process is described in U.S. Pat. No. 5,624,629, the contents of which are incorporated herein by reference. Here, a second or subsequent lateral is lined and cured, at the same time as an initial lateral is being lined in an effort to reduce the overall time of repair of the system. However, because several laterals are typically connected to a particular mainline conduit, it is difficult and almost physically impossible to install lateral seals at more than one location within a mainline conduit at the same time.

Accordingly, it is desirable to provide a device suitable for installation of a flexible lateral seal at the intersection between a lateral pipeline and a main pipeline which can be efficiently operated from a remote location for providing installation from the mainline into the lateral. It is desirable to improve the speed and cycle time required to install a lateral seal in order to provide truly cost effective repair of lateral intersections.

SUMMARY OF THE INVENTION

Generally speaking, in accordance with the invention, an apparatus for installing a cured in place lateral seal having a brim portion bonded to a short tubular section is provided. The apparatus includes a cartridge assembly having a cylindrical flexible bladder with an extendible arm which can be tucked into the bladder to form a recess for receiving the tubular portion of the seal with the brim seated on the outer portion of the bladder. The cartridge assembly is removably mounted on a sled or robot device with positioning motors for positioning the seal at the exact location of the lateral. Use of a replaceable cartridge allows the operator to load a new seal wetted with curable resin on a cartridge as another seal on the sled is being cured in place for rapid exchange.

The bladder is secured to the ends of a cylindrical hollow frame to form a cartridge assembly which has an inlet for introduction of pressurized fluid for inflating the bladder to press the brim portion of the seal against the interior of the main pipeline and everting the arm and tubular portion of the seal out of the recess into of the lateral to form the lateral seal. The cure can be initiated by introduction of heated fluid or electrical power for powering radiant energy source within the bladder such as light energy, either UV or visible, sound or microwaves.

The sled includes on at least one end a lift motor to place the brim portion of the lateral seal on the surface of the main pipeline at the lateral opening. It may include separately operable lift motors at both end of the cartridge. The sled may also include at least one rotational motor for rotating the cartridge circumferentially to align the brim of the seal with the lateral opening.

Accordingly, it is an object of the invention to provide an improved device for installing a flexible cured in place lateral seal into the junction between a main pipeline and lateral connection from inside the main pipeline.

Another object of the invention is to provide an improved device for installing a flexible cured in place lateral seal, including a cartridge holding the resin impregnated lateral seal which can be replaceably mounted on a delivery sled for assembly.

A further object of the invention is to provide an improved bladder cartridge for insertion into a delivery sled for the rapid installation of flexible cured in place lateral seals from the mainline of an existing conduit.

Still another object of the invention is to provide an apparatus for the installation of a curable resin lateral seal providing a source of radiant energy with a bladder assembly.

Yet another object of the invention is to provide a bladder apparatus for the installation of a light curable resin lateral seal providing a source of curing light within the bladder apparatus.

Still other objects and advantages of the invention will in part be obvious and will in part be apparent from the specification.

The invention accordingly comprises the several steps and the relation of one or more of such steps with respect to each of the others, the apparatus embodying features of construction, combination(s) and arrangement of parts which are adapted to effect such steps, and the product which possesses the characteristics, properties, and relation of constituents (components), all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 3:
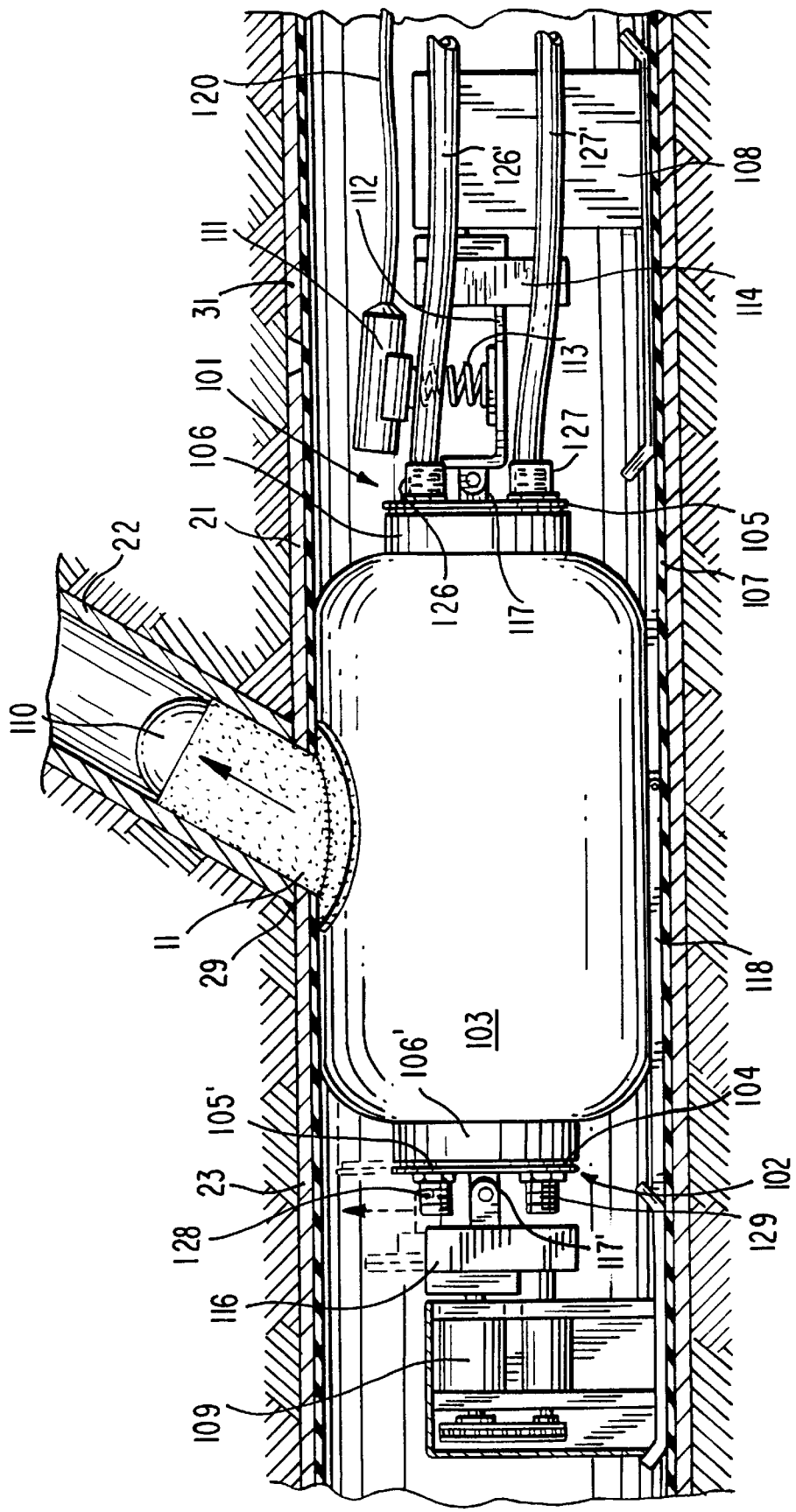
FIG. 3 is an elevational view of an apparatus including a bladder cartridge and delivery sled for the installation of a lateral seal from the main pipeline constructed and arranged in accordance with the invention.

An apparatus 101 for installing a lateral seal 11 at the intersection between an existing main pipeline 21 and a lateral pipeline 22 is shown in FIG. 3. In this particular case, main pipeline 21 has previously been lined with a cured in place lining 23 utilizing the Insituform Process. It is possible to utilize the apparatus for installing seal 11 to seal the connection in a main pipeline which has not been relined. Alternatively, main pipeline 21 may have been lined utilizing other trenchless technology processes, commonly referred to as fold and formed, diameter reduction, or slip lining and the like.

Figure 1:
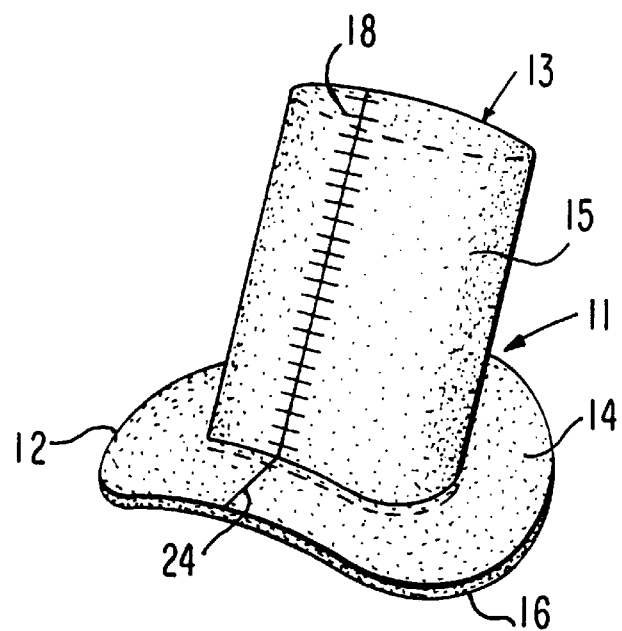
FIG. 1 is a perspective view of a flexible resin impregnable lateral seal including a brim portion bonded to a short tubular portion to be installed using the apparatus constructed and arranged in accordance with the invention.

Referring specifically to FIG. 1, seal 11 includes a substantially flat brim 12 bonded to a relatively short tubular section 13. Brim 12 is formed of a resin impregnable layer 14 and an impermeable layer 16 bonded thereto. Tubular portion 13 is bonded to brim 12 by a compatible adhesive, a hot melt material or flame bonding.

Tubular portion 13 is formed from a substantially planar piece of resin impregnable lining material 15 coated on one side with an impermeable layer 20 which has been joined together edge to edge in a butt seam relationship with a row of stitches 18 to hold the edges together. A band of impermeable material 19 in the form of a tape or quantity of an extruded material is placed over stitches 18 to maintain the impermeable characteristics of impermeable layer 20.

Brim 12 formed from a substantially planar resin impregnable material 14 is also coated on one side with an impermeable layer 16 dimensioned to conform to the opening between lateral 22 and main pipeline 21. Typically lateral 22 may intersect main pipeline 21 at a 60° angle as illustrated in the completed installation in FIG. 2. However, laterals may be found to intersect a main pipeline at angles of 45° and/or 90°. In these cases, the opening between the lateral and mainline will vary, depending on the angle and relative size of the pipelines. This can be determined during the prepatory inspection and video steps in the rehabilitation so that custom made lateral seals 11 can be fabricated as needed. A guide line 24 is provided on impregnable layer 14 of brim 12 to aid in the installation as will be described in more detail below.

Figure 5:
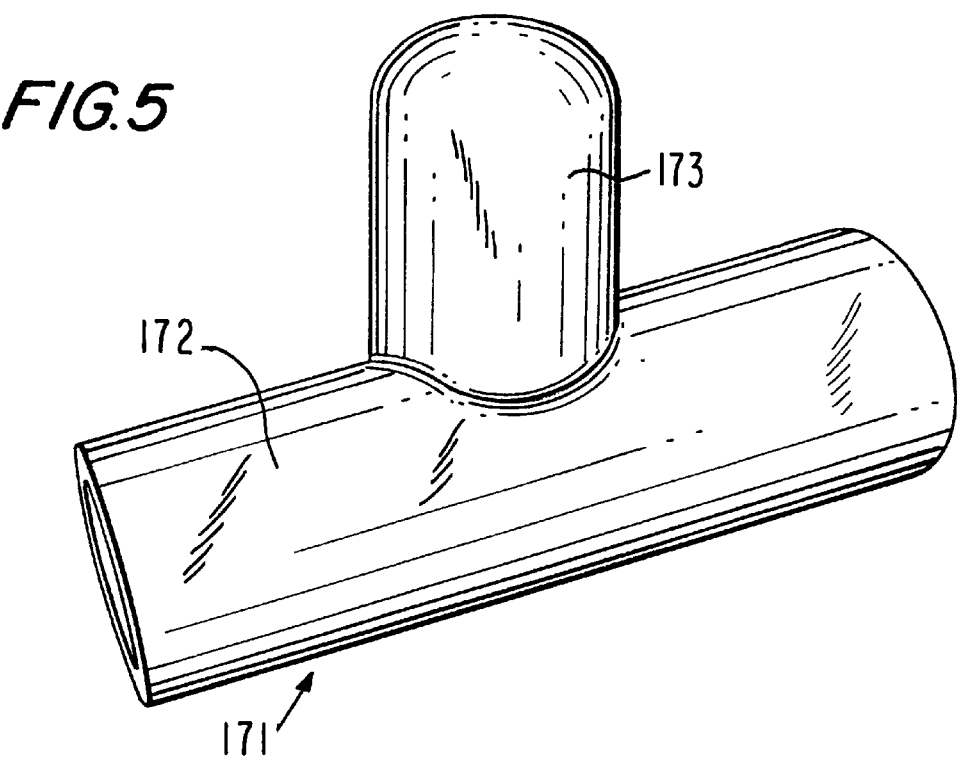
FIG. 5 is a perspective view of the bladder as it is installed about the frame of FIG. 4 in accordance with the invention.

When a light cure resin is used to impregnate seal 11, lamps emitting visible light having a wave length in the range of about 300 to 500 nanometers are mounted within a bladder cartridge 102 shown in FIGS. 3 and 5. Resin impregnable material 16 and 18 is typically an acrylic or polypropylene felt or a glass fibrous matte which will transmit the visible light when impregnated with a modified polyester or epoxy to yield a resin which is light curable as discussed in U.S. Pat. No. 4,581,247, the contents of which are incorporated herein by reference.

Resin 34 is a composition of a free radical light cureable resin admixed with an effective amount of a visible light, photo-bleaching initiator system and optionally performance enhancing fillers which can be impregnated into resin impregnable layers 17 and 22 and subsequently cured to a suitable depth. The resin can be selected from oligoeters of mono-ethylenically unsaturated urethanes, epoxies, polyesters and acrylics.

In the preferred embodiments of the invention, the resin is an epoxy acrylate resin which is a diglycydyl ether of bisphenol A which has been esterified with acrylic acid or methacrylic acid and which may include an ethylenically mono-unsaturated compound as a viscosity modifier admixed with an effective amount of a photo-bleaching visible light initiator system. The photo-bleaching initiator system includes a visible light sensitizer which is a fluorone derivative admixed with a hydrogen donor compound.

The visible light curable sensitizer compound includes a fluorone derived material. The fluorone derivative visible light sensitizer compound has the general formula

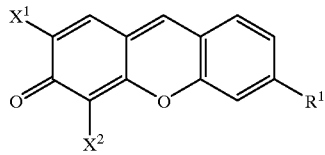

wherein in $R^1$ is hydrogen, $C_1$–$C_8$ alkyl, acyl and $X^1$ is a hydrogen atom or a halogen atom and $X^2$ is a hydrogen atom or the same or different halogen atom, a benzoyl group, a group of the formula —$L(C_2)_n{}^2$ where n is 1 to 8 and $R^2$ is hydrogen, hydroxy, amino, dialkylamino, —$COR^3$, or —$COOR^4$ wherein $R^3$ is hydrogen, chlorine, COC, $C_1$ to $C_8$ alkyl, aryl, COR, 2,4 dinitrophenyl, N-imido or $N_2$ and L is a direct bond or >C=0 and R is hydrogen or lower alkyl, and those disclosed in U.S. Pat. No. 5,451,343. The preferred fluorone derivative is 5,7-diiodo-3-butoxy-6-fluorone. The fluorone derivative sensitizer is mixed with an electron donating coinitiator, such as a tertiary amine to form the photoinitiator system. Triethanolamine has been found to enhance the photo-bleaching effect of the fluorone sensitizer.

After lateral seal 11 is installed, brim 12 sits along the interior surface of main pipeline 21 and will bond to previously installed lining 23. Tubular portion 13 extends a desired distance into lateral pipeline 22. This effectively seals what is generally considered to be a principal shortcoming in the lining of existing pipelines. In a relined sewer system with lateral seal 11 is installed after a cutout 29 is formed on lining 23. Once seal 11 is installed, it will be more difficult for ground water at a remote fracture 31 from entering relined main pipeline 21 at cutout 29. This is because cutout 29 is generally formed using a remote cutting tool with a router bit or the like leaving a rough opening. This created a long felt need for providing an effective lateral seal to seal the connection between a lateral pipe 22 and main pipeline 21.

Lateral seal 11 can be effectively installed utilizing an apparatus shown generally as 101 in FIG. 3. Apparatus 101 includes a bladder cartridge 102 including an inflatable bladder 103 mounted on a substantially rigid bladder frame 104 with a proximal end plate 105 and an identical cup shaped distal end plate 105' with side wall sections 106 and 106'. Bladder 103 is mounted to side wall sections 106 of end plates 105. As illustrated in FIG. 3, bladder frame 104 carrying bladder 103 is mounted in a delivery sled 107 equipped with a proximal positioning motor 108 and a separately operable distal lift motor 109 and a TV camera 111 mounted on a motor arm 112 by a spring 113.

Motor arm 112 is mounted on rack of a rack and pinion lift bar 114 which is operably coupled to proximal positioning motor 108. Proximal positioning motor 108 provides lift to lift bar 114 for elevating the proximal end of bladder cartridge 102 at a proximal lug 117 connection at proximal end plate 105 and also includes a rotational motor (not shown) for rotating motor arm 112 radially for positioning seal 11 at the entrance to lateral 22. Distal lift motor 109 also includes a lift arm 116 which includes a rack and pinion for lifting or lowering the distal end of bladder cartridge 102 by a distal lug connection 117' at distal end plate 105'.

Delivery sled 107 includes a base plate 118 for supporting motors 108 and 109. Base plate 118 is mounted on a pair of sled runners 119 at each end for displacement of apparatus 101 along the length of existing main pipeline 21 at the location of lateral 22. Positioning is facilitated by using TV camera 111 which is controlled remotely by a cable 120. TV camera 111 is mounted on spring 113 to permit displacement downward as lift motor 108 lifts bladder cartridge 102 into position adjacent to the opening to lateral 22.

Proximal end plate 105 includes at least one inlet port 126 which provides access to the interior of bladder cartridge 102 for providing a source of pressure to inflate bladder 103 and power a source of radiant energy in the interior of bladder 103 for initiating the cure of resin impregnated in impermeable layer 14 and 15 of seal 11. In the illustrated embodiment, pressure is provided by an air/vacuum hose 126' coupled to inlet port 126. A power line 127' is coupled to another inlet port 127 to provide power to a source of radiant energy within bladder 103. Corresponding ports 128 and 129 are provided in distal end plate 105. This is beneficial as it permits utilizing one port 128 to allow air to escape when the pressurized fluid is air. Alternately, water can also be expelled through distal output 129. However, this may not be wholly desirable since the portion of the main pipeline being lined is generally bypassed from the remainder of the pipe system. By providing comparable inlet and outlet ports on both proximal end plate 105 and distal end plate 105', bladder cartridge 102 can be inserted into delivery sled 107 in either direction. This greatly facilitates installation of laterals which intersect main pipeline 21 in opposed directions.

As pressurized air is applied to the interior of bladder 103, bladder arm 110 which was tucked within bladder 103 everts through the opening in brim 12 of seal 11 forcing tubular portion 13 of seal 11 to evert into lateral 22. Seal 11 is held in place as long as bladder 103 and arm 110 remain inflated. Generally air or water under pressure can be utilized to inflate bladder 103. When water is utilized and provides heat as the source of radiant energy for initiating the cure, an additional outlet 129 in distal plate 105 is used to permit the water to circulate.

When lateral seal 11 is positioned in place and bladder 103 is inflated, energy is applied to initiate cure of the resin. When the energy is visible light as in the embodiment of FIG. 5, cool air supplied by air hose 126' is circulated through bladder 103. This removes the heat generated by the exothermic cure reaction and the substantial heat generated by the halogen lamps as the visible light source. An adjustable pressure relief valve 125, such as a Nupro B-8CPA2 pressure relief valve which is adjustable between 3 to 50 psi with a ½ inch male thread is mounted in port 128. By inputting air at port 126 at about 20 psi through hose 126' and setting valve 125 at 4 psi, 4 psi pressure can be maintained in bladder 103 to keep it inflated.

At the completion of cure which can be as little as five minutes, a vacuum is drawn through air hose 126' now coupled to a vacuum pump to deflate bladder 103. Application of the vacuum to bladder 103 withdraws arm 110 from lateral 22 and causes it to deinvert into bladder 103. Withdrawal of arm 110 from within seal 11 is thus accomplished without use of a rope or other pulling mechanism which would otherwise present an opaque region and cast a shadow which would interfere with light projected into lateral 22 during the cure cycle.

Providing bladder cartridge 102 as a separate removable unit from delivery sled 107 results in several significant operational advantages. This allows loading of a second impregnated lateral seal 11 on a second bladder cartridge 102 as a first is being used to install and cure at one lateral location. As soon as the lateral connection being installed is completed, delivery sled 107 is removed from main pipeline 21, spent bladder cartridge 102 is removed and a second bladder cartridge 102 previously loaded with resin impregnated seal 11 is then inserted at both lug connections 117 and 117' and a second lateral installation can begin immediately. This is a significant time saving advantage. This is particularly true when a visible light cure resin is used as will be described in connection with the most preferred embodiment below.

Figure 4:
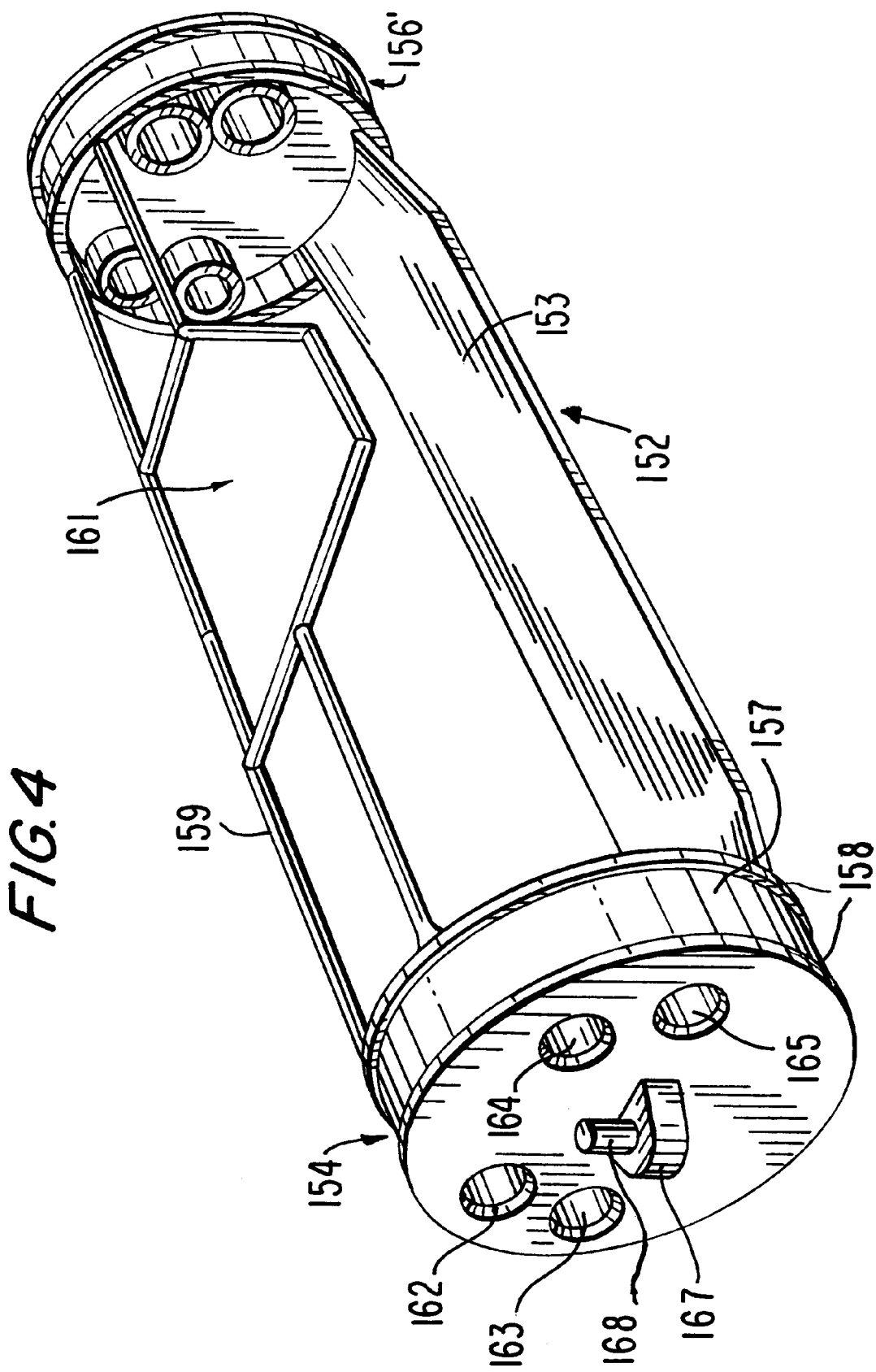
FIG. 4 is a perspective view of a frame for the bladder cartridge of the apparatus of FIG. 3.
Figure 7:
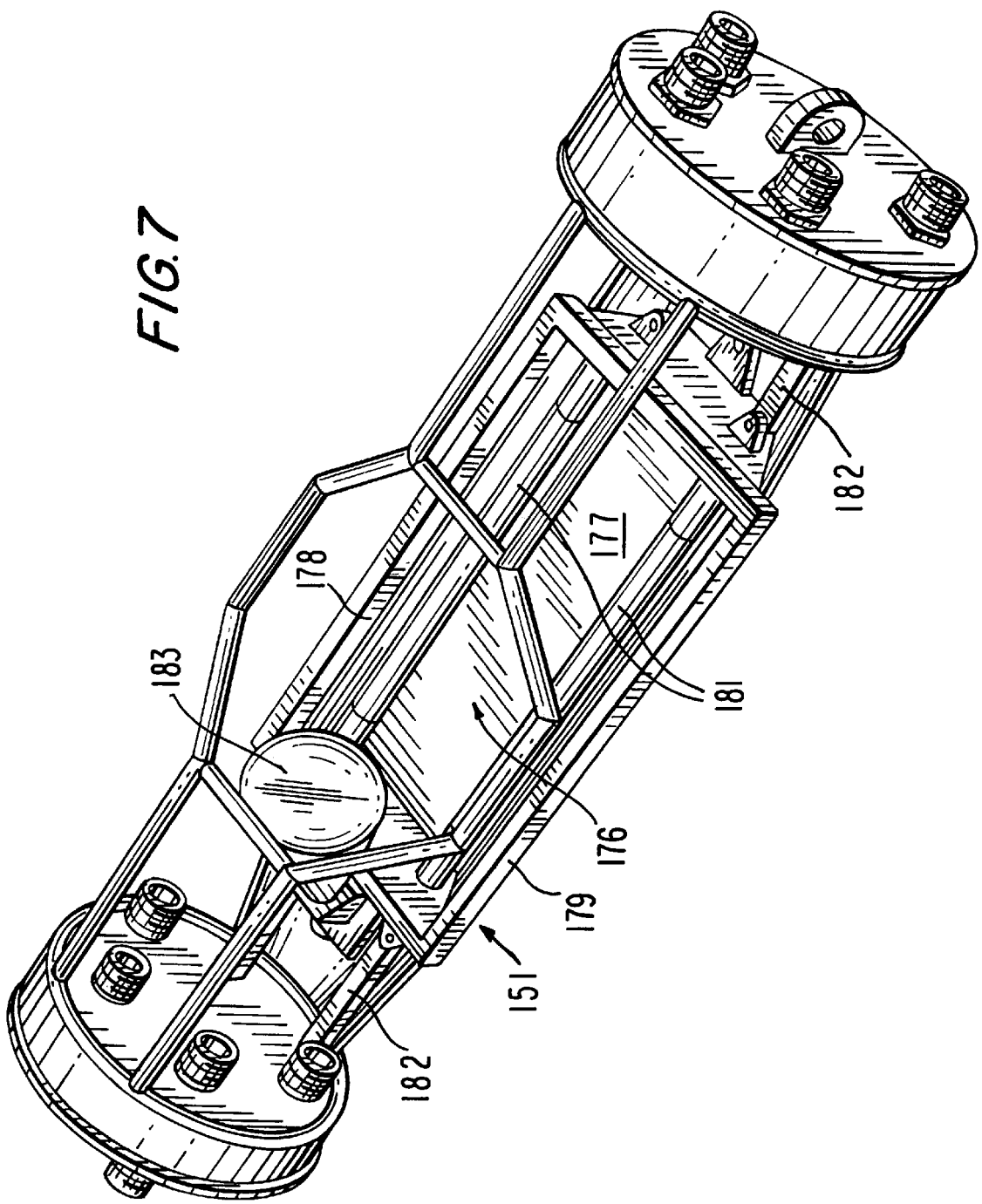
FIG. 7 is a rigid frame of the type illustrated in FIG. 4 modified for installing a lateral seal to be cured by light in accordance with a preferred embodiment of the invention.

A bladder frame assembly 151 fully outfitted for use in such a visible light lateral seal installation is shown in perspective in FIG. 7. The individual elements assembly 151 will now be described. FIG. 4 illustrates a bladder frame 152 having a substantially rigid planar base 153 and cup shaped end plates 154 and 156 have a sidewall 157 with projections 158 for a securing bladder 171 shown in FIG. 5 thereto. Each such end plates 154 and 156 is substantially identical which allows completed bladder frame assembly 151 to be mounted in either direction onto sled 107. This is more significant when lights have been installed, particularly when laterals intersect the main pipeline at an angle. End plates 154 and 156 are welded to the end of base 153. A tubular steel skeleton frame 159 having a central opening 161 for providing access to the interior of bladder frame assembly 151 is welded between end plates 154 and 156 opposite base 153.

End plates 154 and 156 are formed with four threaded conduit 162, 163, 164, and 165. These will be described in more detail with respect to the completed bladder frame assembly 151. These conduits are utilized for providing pressurized air, an air gage, an air relieve valve and air electrical power line, respectively. Each end plate also includes a clevis or mounting lug 167 which can be coupled to delivery sled 107 merely by passing a bolt 168 through the opening in lug 167.

Referring now to FIG. 5, a bladder 171 specially designed for use with bladder frame assembly 151 is shown in perspective. Bladder 171 includes an elongated tubular portion 172 and an invertible flexible arm 173 connected to the midsection for extending up into the lateral during operation when internally pressurized. In the case of a visible light cure device, bladder 171 is formed from a transparent silicone rubber material which permits light from lights mounted on bladder frame 152 to be transmitted into resin impregnable layers 14 and 15 of seal 11 and initiate the cure. Preferably, silicone bladder 171 transmits 25 to 65 percent light from within. Each end of tubular section 172 remains open for facilitating placement of bladder frame 152 within bladder 171.

Prior to securing bladder 171 to bladder frame 152, visible light lamps 181 are secured to base plate 153 of bladder frame 152. When a visible light cure system is utilized, lamps 181 emitting visible light within the range of about 400 to 600 nanometers are utilized. Preferably, lamps 181 are 1000 watt halogen lamps having a tungsten halide filament mounted with a substantially rectangular light box 176. These lamps emit light rich in the 470 nanometer region. Box 176 has a bottom 177, sidewalls 178 and a transparent glass top plate 179 with visible light lamps 181 positioned within light box 176. Matching electrical connections 182 are provided both ends of light box 176 so that light bladder frame assembly 151 may be inserted into delivery sled 107 in either direction as discussed above.

Figure 2:
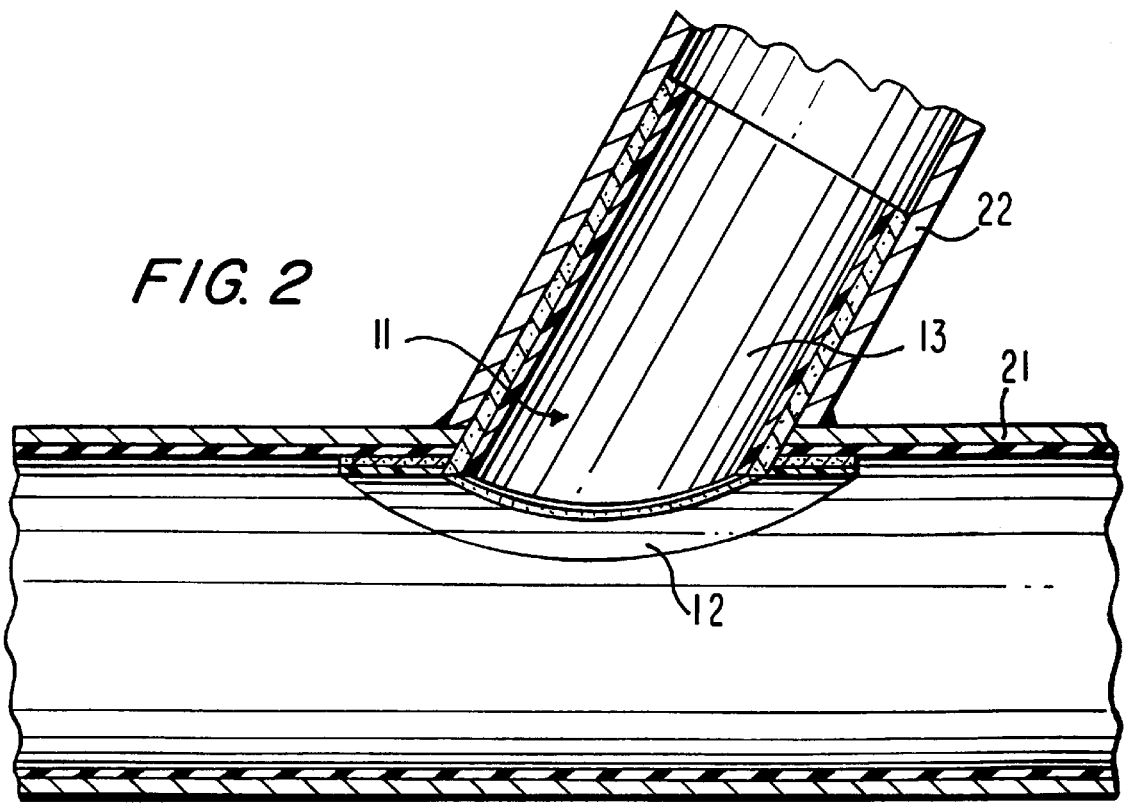
FIG. 2 is a cross-sectional view showing the position of the lateral seal of FIG. 1 after installation at the intersection of a main pipeline and a lateral pipeline.

When installing lateral seal 11 in lateral pipeline 22, such as shown in FIG. 2 which intersects main pipeline 21 at a wye or angle, it is desirable to provide sufficient light extending into lateral pipeline 22 to insure that the resin in tubular section 13 is fully cured. In order to accomplish this, an additional visible light emitting lamp 183 is provided at one end light box 176 projecting upwardly at an angle into the location of lateral 22. In this embodiment, a small 300 watt projector lamp 183 is aimed towards the dark or short side of wye fitting. The cavity between light box 176 and skeleton 159 at the opposite side of light box 176 remains free so that tubular portion 13 of lateral seal 11 can tucked within the interior of bladder frame 152 as seal 11 is loaded for installation.

Figure 6:
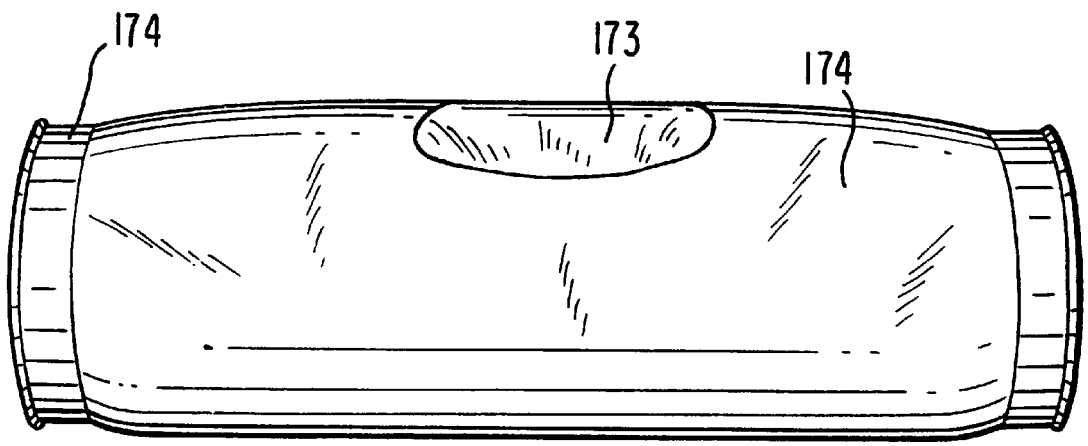
FIG. 6 is an elevational view of the bladder cartridge with the bladder of FIG. 5 installed and secured to the frame of FIG. 4.

When bladder frame 152 is fully assembled, it is slipped within bladder 171 which is then sealed by a tape or packaging band 174 as shown in FIG. 6. Here, arm 173 has been tucked into opening 161 in skeleton 159 of bladder frame 157.

Figure 8:
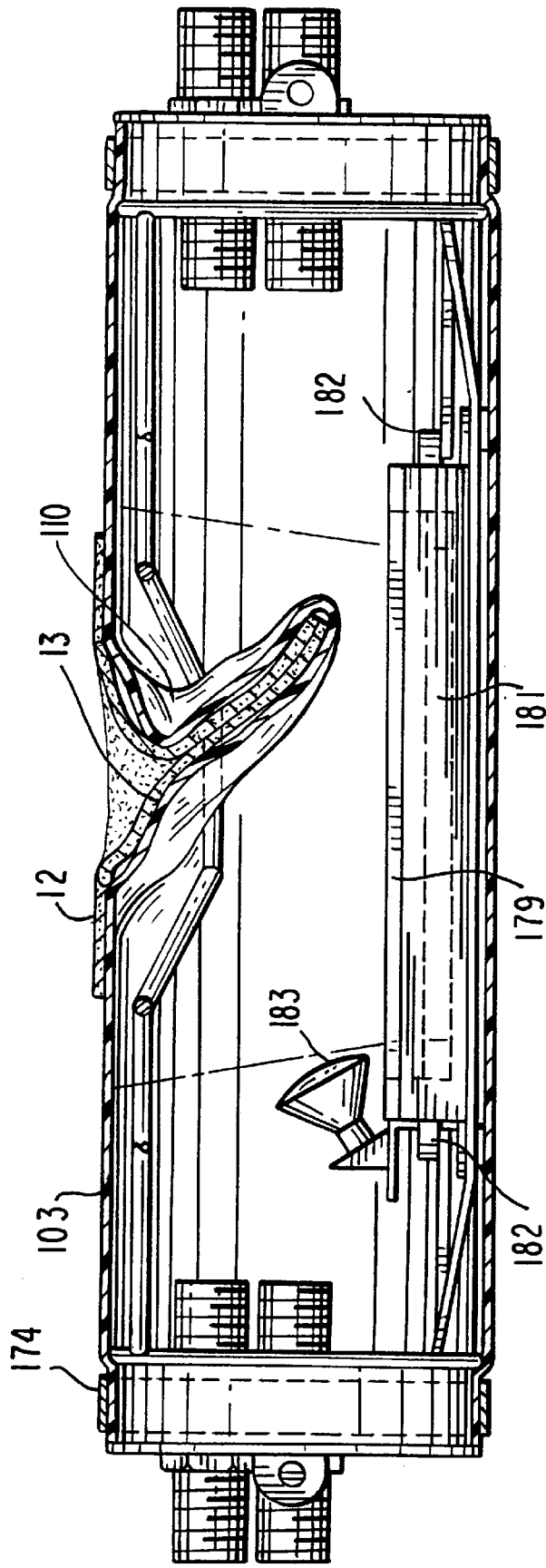
FIG. 8 is a cross-sectional view of the assembled frame of FIG. 7 with a lateral seal of the type illustrated in FIG. 1 loaded and ready for installation.

The fully constructed visible light bladder frame assembly as illustrated in FIG. 7 with bladder 171 secured by bands 174 is completed lateral seal 11 is loaded for use. A fully loaded bladder cartridge 151 with seal 11 ready for installation is illustrated in cross-section in FIG. 8. Here, each of the elements has been identified by the reference numerals utilized in connection with FIGS. 4–7. Further description of these elements is not necessary at this time.

Figure 9:
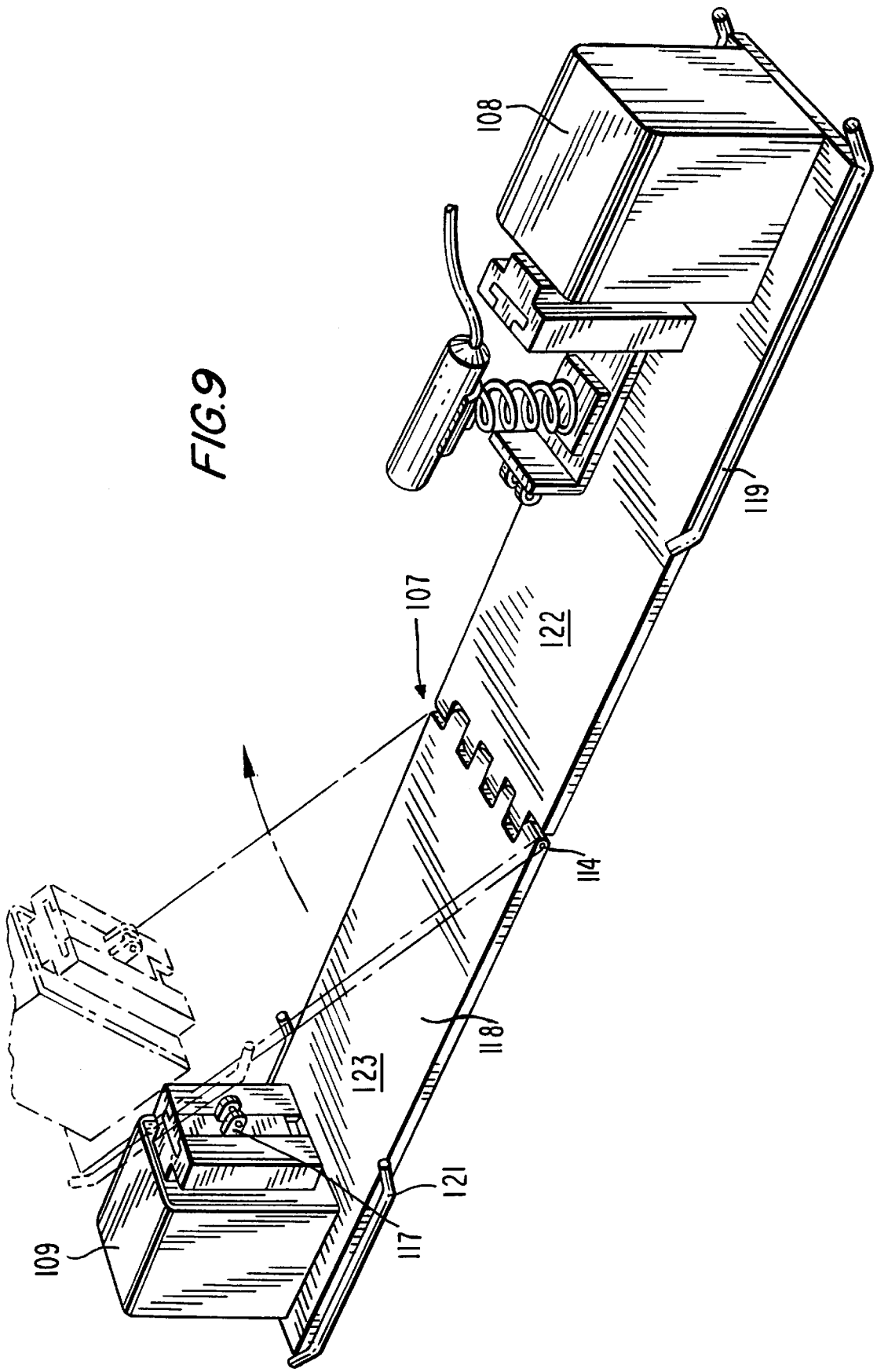
FIG. 9 is a perspective view of a delivery sled as shown in FIG. 3 constructed and arranged in accordance with the invention for receiving the cartridge of FIG. 4 and positioning the seal during installation.

Referring now to FIG. 9, a perspective view of delivery sled 107 is shown. Each of the elements described in connection with FIG. 3 are identified by the same reference numerals herein. Delivery frame 107 includes a base 118 having a proximal base half 122 and a distal base half 123 coupled together at a hinge 124. Motors 108 and 109 are positioned on respective base halves 122 and 123. A proximal pair of sled runners 119 are mounted to proximal base half 122 and a pair of distal sled runners 121 are mounted to distal base half 123. Mounting lugs 117 for coupling to a mating lug 167 on light bladder frame assembly 151 is shown on distal lift motor 109.

Delivery sled 107 is fabricated with hinge 124 in order to permit insertion of sled 107 into a main pipeline which has restricted or limited access. Since delivery sled 107 with TV camera 111 and motors 108 and 109 is almost double the length of bladder frame assembly 151, this allows placement of distal end of delivery sled 107 into a main pipeline 21 when folded at hinge 124, retracting it from the end of the pipeline, flattening base 118, inserting bladder assembly 151 and then locating apparatus 101 within main pipeline 21 for installation of seal 11.

Figure 10:
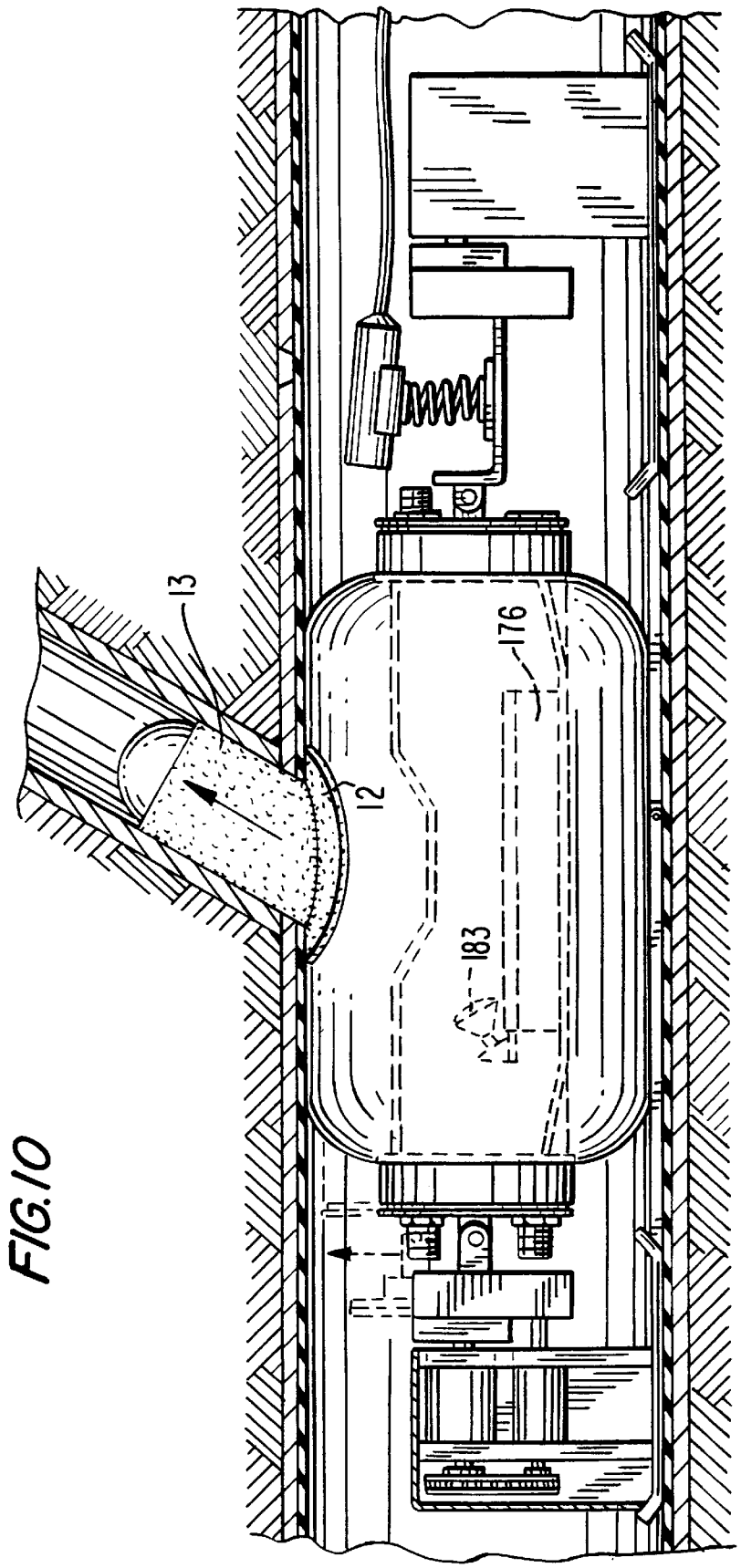
FIG. 10 is a cross-sectional view of the apparatus for installation using the apparatus of FIG. 3 outfitted for curing with visible light with the bladder expanded in position.

Once inserted into main pipeline 21, sled runner 119 and 121 rest against lining 23 in main pipeline 21 as illustrated in FIG. 10. When in position at the entrance to lateral 22 and pressurized, bladder arm 110 or 173 everts through tubular portion 13 of seal 11 and extends into lateral 22 as shown in the cross-sectional view of FIG. 11. FIG. 12 illustrates the same view in elevation with secondary lamp 183 providing light to extend up into the dark or short distal region of tubular portion 13 which would otherwise not be illuminated by light emitted from light box 176 alone.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for installing a resin impregnated cured in place lateral seal having a brim portion bonded to a short tubular portion, comprising:
    a bladder frame including, a substantially rigid elongated base with two opposed end plates dimensioned to fit within a main pipeline, a skeleton frame between the end plates opposite the base, having a central opening for providing access to the interior of the bladder frame;
    an expandable bladder with an extendable inflatable arm mounted on the end plates where in the arm can be tucked into the bladder and within the bladder frame,
    a radiant energy source disposed within the bladder frame;
    at least the arm portion of the bladder being substantially transparent to the radiant energy;
    the end plates having access means to the interior of the bladder frame for supplying at least pressurized fluid to the interior of the bladder, and
    means for displacing the bladder frame and bladder in the main pipeline to the location of the lateral pipeline.

2. The apparatus for installing a lateral seal of claim 1 wherein the radiant energy source mean is at least one lamp for generating light for initiating the cure of the resin.

3. The apparatus for installation of a lateral seal of claim 2, wherein the lamp is a source of visible light.

4. The apparatus for installation of a lateral seal of claim 2, wherein the lamp is a tungsten halide lamp generating light in the visible range.

5. The apparatus for installation of a lateral seal of bladder frame claim 1, further including a sled for receiving the bladder frame and bladder, the sled including selectively operable motor means for controlling position of the opening of the bladder frame from a location remote to the apparatus.

6. The apparatus for installation of a lateral seal of claim 5, wherein the sled includes means for receiving the bladder frame and remotely actuateable motor mean for positioning the brim within the main pipeline.

7. The apparatus for installing a lateral seal of claim 5, wherein the motor means includes a first motor at one end of the sled selectively operable to lift the bladder frame towards the lateral opening.

8. The apparatus for installing a lateral seal of claim 7, further including a second motor disposed at the opposite end of the sled for lifting the second end of the bladder frame.

9. The apparatus for installing a lateral seal of claim 5, wherein the motor means include a rotational motor for rotating the bladder frame within the pipeline for aligning the opening in the frame with the lateral connection.

10. The apparatus for installing a lateral seal of claim 5, wherein the sled is formed in two sections coupled with a hinge for facilitating positioning of the sled into a pipeline having restricted access.

11. The apparatus for installing a lateral seal of claim 1, further including an air pressure input in the end plate for inflating the bladder and in an outlet in the end plate for allowing air to escape from the bladder to cool the bladder while maintaining inflation of the bladder.

12. The apparatus for installing a lateral seal of claim 11, wherein the air outlet is an adjustable air relief valve.

13. The apparatus for installing a lateral seal of claim 1, further including vacuum means attached to the end plate for deflating the bladder.

14. The apparatus for installing a lateral seal of claim 1, wherein the expandable bladder is a substantially light transparent material.

15. An apparatus for installing a resin impregnated cured in place lateral seal having a brim portion bonded to a short tubular portion, comprising:
    a bladder frame including, a substantially rigid elongated base with two opposed end plates dimensioned to fit within a main pipeline, a skeleton frame, having a central opening for providing access to the interior of the bladder frame, mounted between the two opposed end plates opposite the base;
    an expandable bladder with an extendible inflatable arm mounted on the bladder frame where in the arm can be tucked into the bladder within the bladder frame;
    a radiant energy source disposed within the bladder frame;
    at least the arm portion of the expandable bladder being substantially transparent to the radiant energy;
    the endplates having access means to the interior of the bladder frame for supplying at least pressurized fluid to the interior of the bladder;
    a sled for displacement within an existing pipeline or conduit of the bladder frame and bladder including;
    means for receiving the bladder and remotely actuable motor means for positioning the opening of the bladder frame within the main pipeline from a remote location;
    the motor means includes a first motor at one end of the sled selectively operable to lift the bladder frame and bladder towards the lateral opening and a rotational motor for rotating the bladder frame and bladder within the pipeline aligning the opening in the bladder frame with the lateral connection; and
    the sled being formed in two sections coupled with a hinge for facilitating positioning of the sled into a pipeline having restricted access.

* * * * *